(12) United States Patent
Laurent et al.

(10) Patent No.: US 6,640,859 B1
(45) Date of Patent: Nov. 4, 2003

(54) NON-PNEUMATIC RESILIENT TIRE

(75) Inventors: Daniel Laurent, Marly (CH); Antonio Delfino, Grolley (CH); Henri Hinc, Onnens (CH)

(73) Assignee: Conception et Developpement Michelin S.A., Givizier (CH)

( * ) Notice: Subject to any disclaimer, the term of this patent is extended or adjusted under 35 U.S.C. 154(b) by 0 days.

(21) Appl. No.: 09/466,524

(22) Filed: Dec. 17, 1999

(30) Foreign Application Priority Data

Dec. 18, 1998 (FR) .............................................. 98 16175

(51) Int. Cl.⁷ ................................................ B60C 7/14
(52) U.S. Cl. ........................ 152/276; 152/246; 152/258; 152/280
(58) Field of Search .............................. 152/11, 12, 246, 152/256, 258, 270, 275, 276, 277, 278, 280

(56) References Cited

U.S. PATENT DOCUMENTS

| | | | | |
|---|---|---|---|---|
| 542,842 A | * | 7/1895 | Buckner | |
| 696,875 A | * | 4/1902 | Lewis | 152/275 |
| 807,351 A | * | 12/1905 | Bleoo | 152/276 |
| 902,212 A | * | 10/1908 | Craven | 152/275 |
| 1,243,328 A | * | 10/1917 | Miller | 152/276 |
| 1,346,766 A | * | 7/1920 | Prince et al. | |
| 1,639,827 A | * | 8/1927 | Wayne | 152/12 |
| 1,687,206 A | * | 10/1928 | Hatvani | |
| 1,887,019 A | * | 11/1932 | Hart | 152/276 |
| 2,435,599 A | * | 2/1948 | Perreau | 152/275 |
| 4,265,293 A | | 5/1981 | Curtiss, Jr. et al. | 152/354 |
| 5,050,656 A | | 9/1991 | Ho | 152/11 |
| 5,535,800 A | | 7/1996 | Abbott | 152/517 |
| 5,743,316 A | * | 4/1998 | Chrobak | |

FOREIGN PATENT DOCUMENTS

| | | |
|---|---|---|
| FR | 374345 | 6/1907 |
| FR | 392603 | 12/1908 |
| FR | 495100 | 9/1919 |
| GB | 279839 | 10/1927 |

OTHER PUBLICATIONS

Patent Abstracts of Japan, EPO 58146738, Sep. 1, 1983, 1 page.
Patent Abstracts of Japan, EPO 63225738, Sep. 20, 1988, 1 page.

\* cited by examiner

Primary Examiner—Russell D. Stormer
(74) Attorney, Agent, or Firm—Baker Botts L.L.P.

(57) ABSTRACT

A non-pneumatic resilient tire which derives its capacity to bear a load from laminated elements capable of supporting bending moments. The laminated elements include a stack of resilient sheets superposed and separated by a layer of rubber adhering to the latter, forming a beam capable of undergoing bending stress.

22 Claims, 11 Drawing Sheets

Fig 11

NON-PNEUMATIC RESILIENT TIRE

BACKGROUND OF THE INVENTION

The present invention concerns vehicle wheels of any type and, in particular, a non-pneumatic tire designed to be capable of bearing a load without inflation pressure.

It is known that the reinforced rubber tire inflated to working pressure has come into common use, so great are its qualities of comfort and sturdiness. It has been successfully adapted to applications as different as passenger vehicles, construction equipment, airplanes, motorcycles, farm machinery, heavy trucks, etc. The inflation pressure makes it possible to bear a load and distribute it on the surface.

Although the reliability of a pneumatic tire has become remarkable, it is known that the risk of a flat is not totally eliminated. The problem is that, in case of loss of inflation pressure, or even more insidiously in case of a substantial reduction of inflation pressure, the tire is no longer able to render the service for which it is designed under good conditions. Hence, there has been a multitude of proposals for non-pneumatic tires (see, for example, U.S. Pat. No. 5,050,656), the object of which is to eliminate the main cause of tire failure (flats), but which have not come into use for lack of being able to offer a sufficient level of comfort and/or endurance and/or capacity to bear heavy loads. Hence, there have also been numerous proposals aimed at providing tires with a greater capacity to roll temporarily without inflation pressure, for example, as described in U.S. Pat. No. 5,535,800.

The proposal cited above has, however, the disadvantage that it is complicated, if not impossible, to design a tire whose sidewalls remain resilient and can tolerate suddenly mounting a curb without damage. In fact, the reinforcing elements incorporated in the sidewalls risk being bent, in case of very marked stress, to the point that their radially outer end joins their radially inner base. In that case, if those elements are locally gripped to the extent of resulting in very small radii of curvature, their breaking point or their elastic limit will be exceeded, depending on the materials used. The object proposed does not therefore provide sufficient safety, since there is a strong likelihood that the tire will be destroyed (or even worse, locally degraded in a dangerous but not immediately apparent manner) by certainly extreme but not abnormal stresses (shock on a sidewalk curb). An ordinary tire, even when greatly deflated, tolerates these stresses much better due to its very flexible sidewalls, incapable of bearing the load by themselves.

The state of the art shows, by wavering between radical solutions (non-pneumatic tire wheel) and the solutions providing tires with a limited capacity to roll without pressure, that the problem of possible tire failure is extremely difficult to solve.

Furthermore, even without tackling the problem of failure, a tire as currently designed presents other disadvantages to which we have become accustomed for a very long time. It can be observed that a bead is so designed that it can be mounted and demounted from the rim, while being able to transfer the working stresses between the tire and the rim through sufficient tightening of the tire on the rim. This requires a rather delicate adjustment. It results in the rather solid and rigid construction known. But considering service rendered the users, there is some waste of material, for the use of a portion of same can be explained only for securing the mountability and demountability of the tire.

It is also known that the compromise between comfort (all the greater the more flexible the sidewalls) and performance (precise steering, which results in stiffening the sidewalls and/or in developing smaller and smaller sizes for passenger vehicle tires) is very difficult to arrange. It is also known that there is a great propensity for tires of a passenger vehicle to lie down under the front wheel on the outside of a turn in case of high transversal acceleration. In this case, the tire works quite poorly, letting the tread go too much and bearing on the road with the shoulder of the tire.

SUMMARY OF THE INVENTION

The object of the present invention is to propose a non-pneumatic tire that can truly be used without inflation pressure, which will be capable, like the pneumatic tire, of bearing a substantial load while providing good comfort, good adherence and good capacity to transmit considerable lateral thrusts. It is a question of proposing an alternative solution to the pneumatic tire. It is not simply a question of providing a tire with the temporary capacity to run flat.

The invention proposes a resilient non-pneumatic tire having an axis of rotation and essentially containing a tread carried by a resilient bearing structure radially situated inside said tread and defining, at least partially, an inner cavity of revolution, said bearing structure comprising:

a zone of attachment radially on the side of the axis of rotation, for the locking of said bearing structure on means of connection to a hub, and said zone of attachment being axially placed between the lateral limits of said bearing structure, said attachment zone being designed for contacting said means of connection to a hub, said means of connection to a hub being designed to form a rigid assembly, a plurality of support elements, extending essentially crosswise, placed between the zone of attachment and the tread, said support elements being juxtaposed circumferentially and distributed all around the circumference, the support elements being fitted in said zone of attachment, each support element containing a bundle of superposed resilient base pieces, separated by a layer of elastomer adhering to each of the base pieces, so as to form a beam capable of undergoing bending stress, an interconnecting structure between the support elements, arranged so that a portion of a radial stress of a support element is transferred to the adjacent support elements circumferentially, while allowing differences in displacement between adjacent support elements.

The capacity to bear a load, in the proposed non-pneumatic tire, is due essentially to the support elements. Distributed circumferentially, the support elements successively come into play for contribution in taking up the load when the non-pneumatic tire is rolling. Several preferably come into play at the same time in the footprint. The support elements are transversely oriented and essentially stressed on bending in order to make their individual contribution to taking up the load (that is, the so-called "Z" stresses). Other stresses do exist, but it will be apparent that the elements are essentially stressed on bending.

Turning to the embodiments of each support elements, it will be shown that they comprise a bundle of flexible base pieces each of which is ribbon-like. The flexible base pieces are stacked radially, with insertions of elastomer adhering on each of the flexible base pieces. The beam thereby built is able to sustain bending in a radial plane. This feature of the support elements is however by no means limitative, namely if it is noted that the support elements have to sustain other deformations, since they do not all deform in a identical way simultaneously, as it will become more apparent hereunder. By describing that the means of connection to a hub form a rigid assembly, it is intended to point out that the whole deflection between the ground and the axis of rotation comes from the deflection of the non pneumatic tire, and not from a rim, a wheel or any suitable device for connecting to a hub, just like a conventional pneumatic tire with respect to its wheel.

DESCRIPTION OF THE DRAWINGS

The invention is explained more in detail by the description of three nonlimitative working examples illustrated in the attached figures, in which.

DESCRIPTION OF PREFERRED EMBODIMENTS

Figure 1:
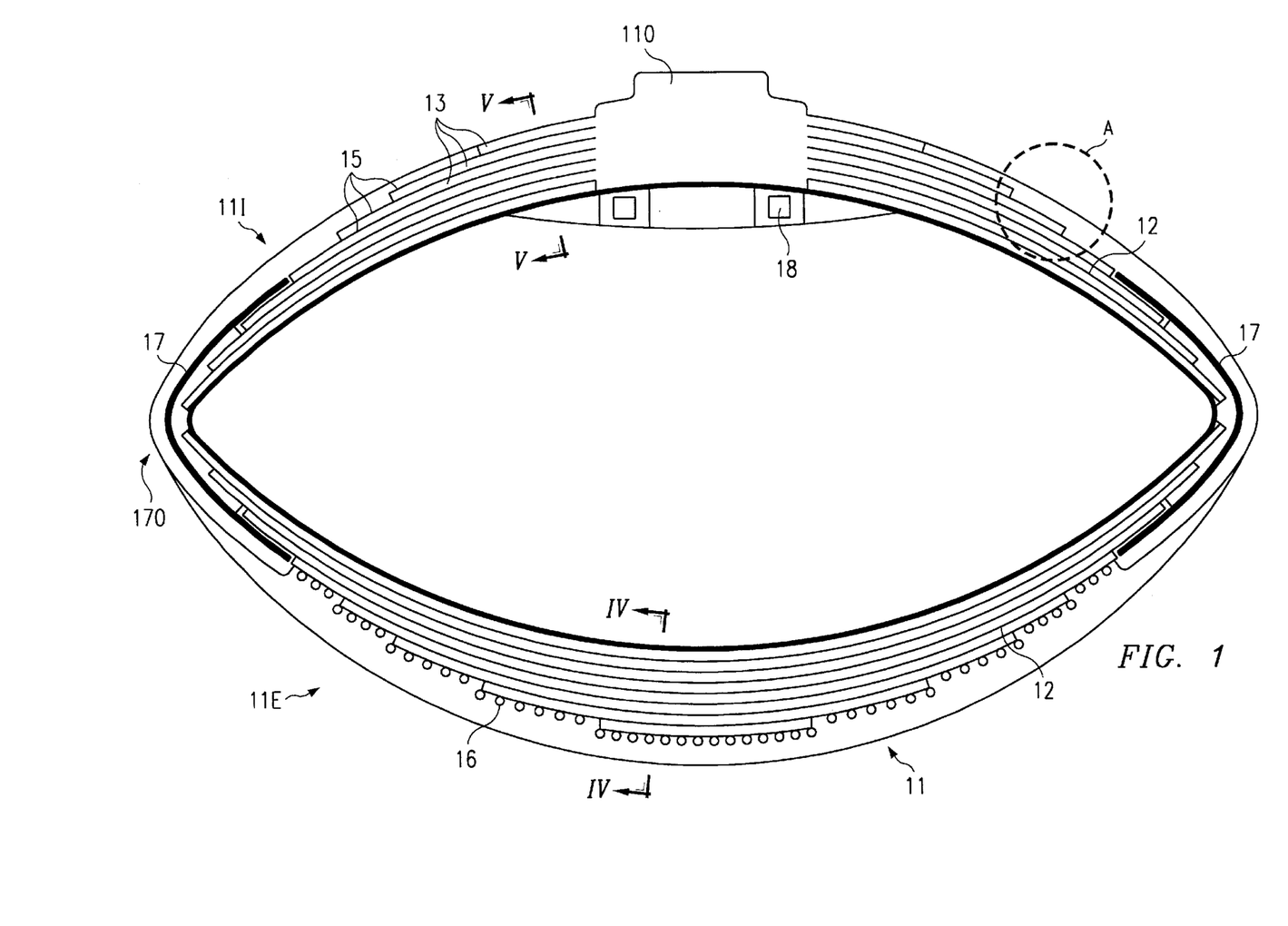
FIG. 1 shows a radial section of a first embodiment of a non-pneumatic tire according to the invention, having a tread of convex shape, resembling the tires designed to operate accepting wide angles of camber.

FIG. 1 shows a non-pneumatic tire having a tread 11 with a generally curved shape. The wall of the tire essentially contains two parts called "first and second structure parts 11I and 11E." These first and second parts are radially superposed and form two springs acting in series and are respectively arranged radially inward and radially outward. One characteristic of this first embodiment is the pseudohinge separating the first 11I and second 11E structure parts, which constitutes a zone of lesser bending strength. This zone of the tire, by its constitution, does not oppose or just slightly opposes folding, that is, the relative rotation of the end parts of the first radially inner structure part and second radially outer structure part. The ends of each of the first and second bearing structure parts are situated roughly at the lateral ends of the bearing structure. The support elements consist of laminated elements 12. Each support element of the first bearing structure part goes from one lateral end to the other lateral end. The profile of the radially outer surface resembles that of motorcycle tires.

The laminated elements 12 are capable of supporting bending moments to a much greater extent than the cords— even wires—ordinarily used to reinforce tires. The laminated elements 12 embody a stack of resilient sheets 13 superposed and separated by a layer of rubber 15 (see FIG. 2). It is suggested here to use rubber as elastomer but it is not limitive. The take-up of a load makes each of the sheets 13 work bending and the rubber of each layer 15 work shearing. The thickness of each layer 15 (which can, furthermore, vary), the thickness of each sheet 13 (which can also vary), the number of sheets, the modulus of elasticity of the materials used for the sheets, the modulus of elasticity of the elastomer used and the arrangement of the sheets are some of the parameters making it possible to adjust the properties of the non-pneumatic tire (which means adjusting the curve giving responsible force to the capacity of the tire to bear a load depending on deflection of the tire, commonly described by the expression "load-deflection curve").

Figure 2:
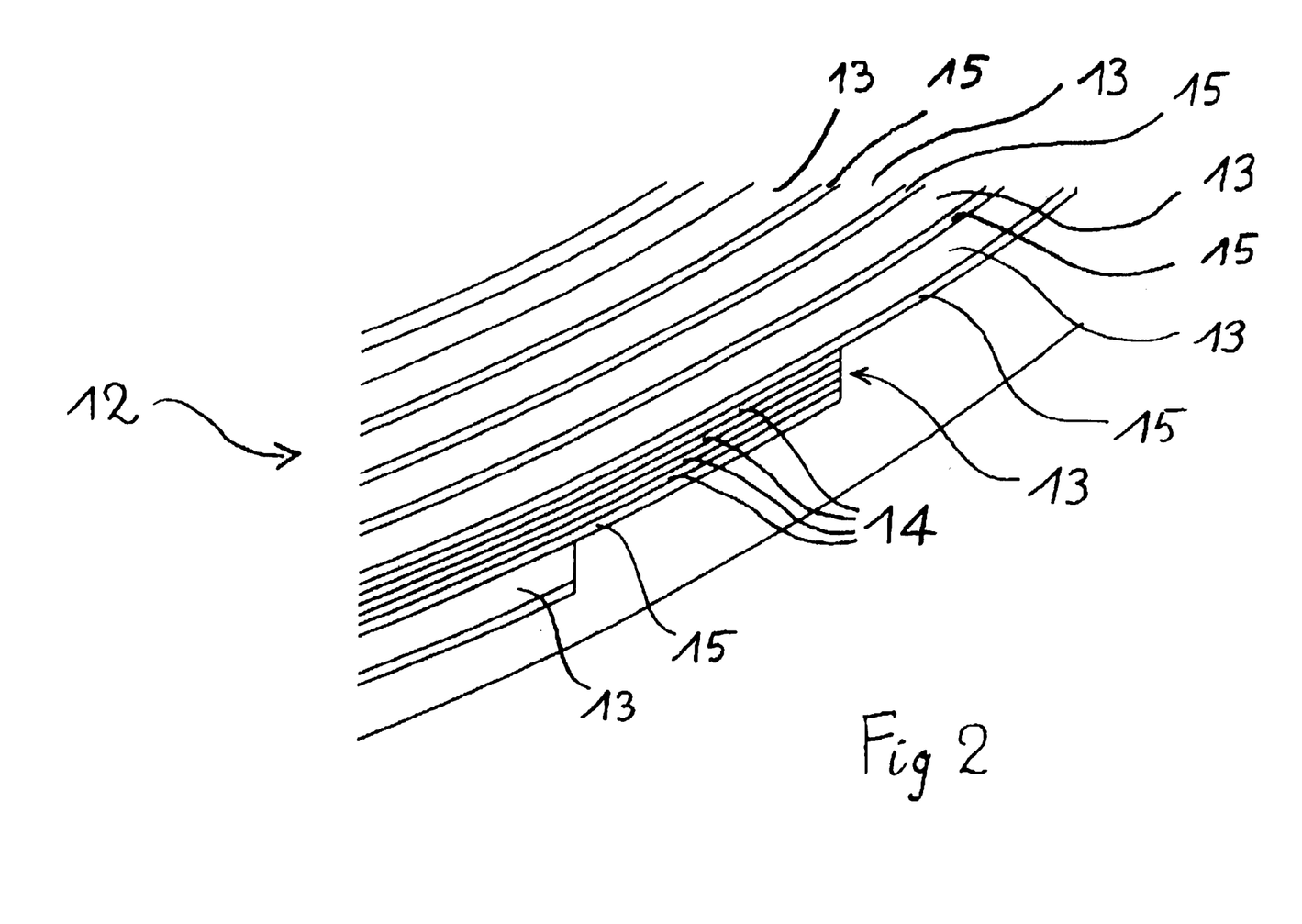
FIG. 2 is an enlargement of the part surrounded by circle A in FIG. 1.

The sheets are, for example, constituted essentially by a thermosetting or thermoplastic resin matrix, reinforced by fibers mainly arranged longitudinally in each sheet, that is, parallel to a meridian plane (that is, a plane containing the axis of the tire) in the non-pneumatic tire. Glass fibers yield good results, but fibers of another kind could also be used, depending on the advantage contributed by their characteristics. One can imagine numerous working variants of the sheets. For example, as can be seen in FIG. 2, each sheet is formed by the superposition of bands 14 glued to one another.

The bands can, for example, be glued in place, that is, in the non-pneumatic tire being manufactured. This is one solution among others for making sheets without preload or at least with a negligible preload, when installed in the non-pneumatic tire with the desired curvature, as drawn in FIG. 1. The advantage of thin bands is that, with any method of manufacture for said bands, they can easily be made to follow exactly any final shape, the final shape being that targeted for a sheet. The bands can be glued together, for example, by means of a fine layer of elastomer or by means of a resin, rendering the sheets more monolithic in the latter case.

The invention thus extends to a method of manufacture of a resilient non-pneumatic tire having an axis of rotation and a bearing structure having a median plane perpendicular to the axis of rotation and defining an inner cavity of revolution, the bearing structure containing a plurality of support elements distributed all around the circumference, each support element being placed roughly crosswise, each support element being a laminated element containing a stack of resilient sheets superposed radially, a method in which the constituents required for building the non-pneumatic tire are placed on a destructible support, and said method embracing, notably, the following steps:

bringing a section of the band on the support,
bending the section to make it follow exactly the shape of the support,
locking the ends of the section,
repeating the preceding stages until obtaining the stacking desired.

In this first embodiment, in a laminated element 12, considering the length of the sheets in abscissa curvilinear on being displaced along a sheet following an orientation going from one lateral end to the other lateral end, said length of each of the sheets 13 decreases on being displaced in thickness of the laminated element from the cavity outward. This is what appears in FIGS. 1 and 3. Using this arrangement, the characteristics of resilience of the non-pneumatic tire can be adjusted by adapting the stack to the bending moment that it is necessary to support locally and by adapting the stack to the deflections it is desired to obtain.

Figure 3:
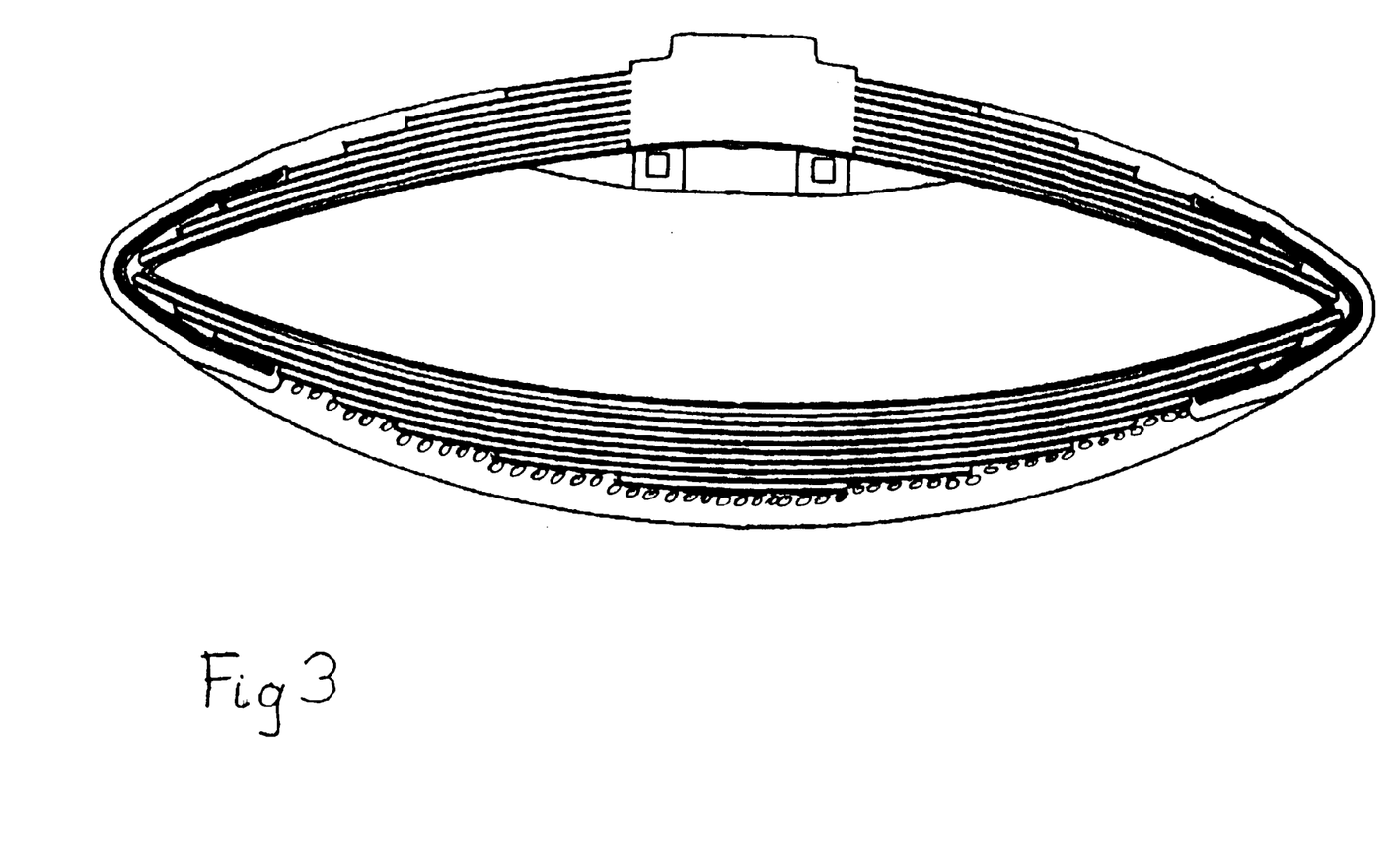
FIG. 3 shows the same non-pneumatic tire deformed to an intermediate deflection level.

Each laminated element, at least in the radially outer bearing structure part, is preferably symmetrical and axially centered. Finally, let us point out that the zone of attachment 110 is preferably in one piece, as can be seen in FIGS. 1 and 3. This means that this part, intended to be attached to a rim, does not present any laminated structure. For example, it contains only a resin matrix and reinforcing fibers, of course, preferably of the same component materials as the sheets, and it contains no rubber. This connection zone is so designed to undergo bending stresses.

Figure 4:
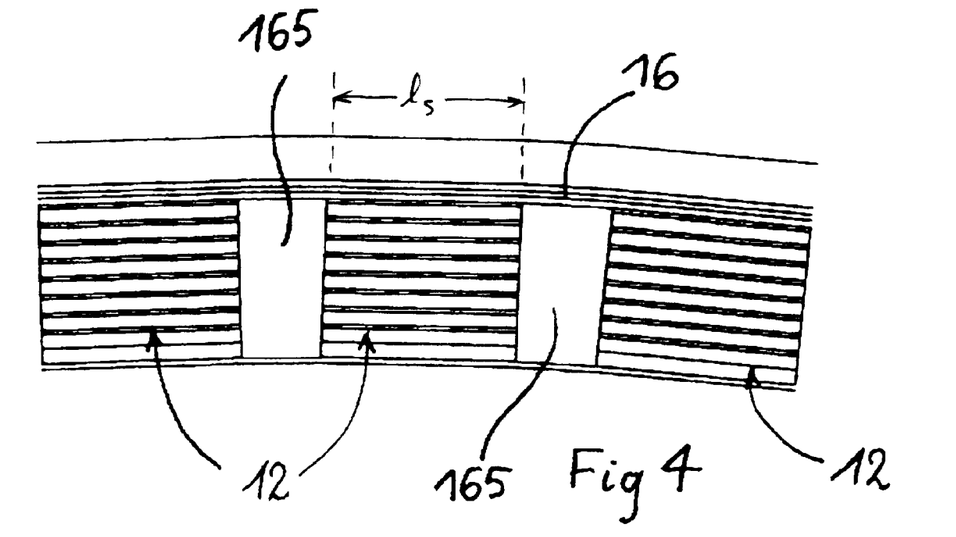
FIG. 4 is a section along IV—IV in FIG. 1.
Figure 5:
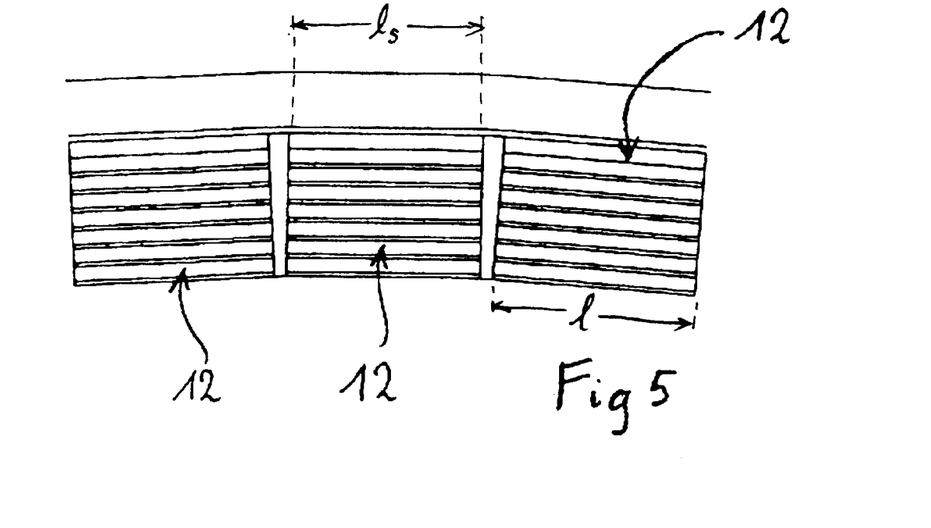
FIG. 5 is a section along V—V in FIG. 1.

After having described the main aspects of the architecture of the non-pneumatic tire, seen in meridian section, let us examine what is its architecture seen in circumferential section, referring for this purpose to FIGS. 4 and 5. Also preferably, in a laminated element, considering that the width "l" is the dimension of the sheets being displaced along a sheet following a circumferential orientation, the width l of the sheets is constant (see FIGS. 4 and 5, as well as FIGS. 10 and 11, for the reader will have understood that this aspect, like many others described, is also true for the other embodiments). It can, in fact, be simpler to manufacture only sheets of the same width. Of course, as is evident on comparing FIGS. 4 and 5, since the width l of the sheets 13 is constant, the space between laminated elements 12 is less in the radially inner bearing structure part 11I than in the radially outer bearing structure part 11E.

Furthermore and still preferably, the width "$l_s$" of the support elements (considered circumferentially) is such that the number of support elements in the whole circumference is at least 80. This is roughly drawn in FIGS. 10 and 11. This renders the tire sufficiently uniform, although the bearing structure thus made cannot be considered homogeneous circumferentially, for example, for its modeling. Such a bearing structure presents a cyclical symmetry, according to a standard terminology. To further improve uniformity, the number of support elements can be increased and their width $l_s$ can be concomitantly diminished in the circumference. The non-pneumatic tire according to the invention is then advantageously such that, considering width $l_s$ the dimension of the support elements on being circumferentially displaced, the width $l_s$ is such that the number of support elements in the whole circumference is at least in the order of 200.

In the radially outer bearing structure part, the proposed interconnecting structure contains circumferential reinforcements at least under the tread. They are, for example, circumferential wires 16 that can be seen, notably, in FIGS. 1 and 4. Said wires ensure the stability of the dimensions of the non-pneumatic tire on centrifuging. Furthermore, said circumferential wires 16 help distribute the load of a support element (laminated element 12) on the adjacent laminated element or elements 12. If one can imagine, notably, what happens if a support element (laminated element 12) mounts an isolated obstacle, the latter is going to tend to be avoided, for the load tends to be applied only on that laminated element instead of being distributed over several laminated elements. As soon as the overloaded laminated element bends more than the adjacent ones, the circumferential wires 16 pull on the adjacent laminated elements 12, thus transferring a part of the load. This leads to a certain warping of the support elements. The support elements are designed so that they can sustain a certain degree of warping stress. The proposed embodiments, having laminated element 12 with base pieces (resilient sheets 13) stacked radially with rubber layer 15 inserted in between, are able to accommodate the encountered warping stress. But of course other embodiments are achievable. The non-pneumatic tire is thus capable of absorbing an isolated obstacle like a stone on the road. Furthermore, the circumferential wires 16 contribute to passage of the torque by distributing the stress over all the laminated elements 12 on the whole circumference of the non-pneumatic tire.

Furthermore, the proposed interconnecting structure also contains a rubber matrix 165 separating the sheets circumferentially (see FIG. 4). The said interconnecting structure could contain only rubber ensuring a connection between support elements, for example, for applications of the invention to moderately stressed non-pneumatic tires. In the example described, the rubber completely fills the space between two adjacent laminated elements. In addition, a layer of rubber completely covers the structural reinforcements of the non-pneumatic tire, thus creating a continuous outer skin like standard tires. Of course, other variants can be developed, for example, devoid of rubber or with much less rubber radially under the circumferential wires 16. This can prove advantageous for attaining a lesser level of rolling resistance.

In the present application, the term "wire" is used in a generic sense, meaning that said wire is supposed to present characteristics sufficient to transfer a portion of the radial stress to the adjacent support elements and to transmit the load beyond the footprint. One can use monofilaments, multifilaments or assemblages like cords or even any equivalent structure, regardless of the material or materials of those wires, their moduli and any treatment of those wires, like surface treatment or coating or precoating to favor adhesion on the rubber. "Circumferential" means an orientation at an angle of zero degree measured in relation to a plane perpendicular to the axis of rotation of the support, thus observing the usual conventions for tires. In practice, the reinforcement can be made by coiling of a wire, with a certain pitch, resulting in the angle not strictly being zero, but, in practice, at least locally greater than zero degree, in order to be able to sweep the entire width desired.

There is nothing imperative, however, about the arrangements described in the three foregoing paragraphs. The laminated elements can be interconnected by layers of a nature similar to layers 13 of each stack. Many other forms of interconnection can be carried out. In short, and to state the essentials, the laminated elements bear the load; they do not work completely isolated from one another, but are connected together to ensure good overall operation, avoiding overly intense shearing between two adjacent laminated elements and so as to offer good uniformity, that is, a relative constancy of properties, regardless of the circumferential position of the non-pneumatic tire relative to the surface.

Figure 1A:
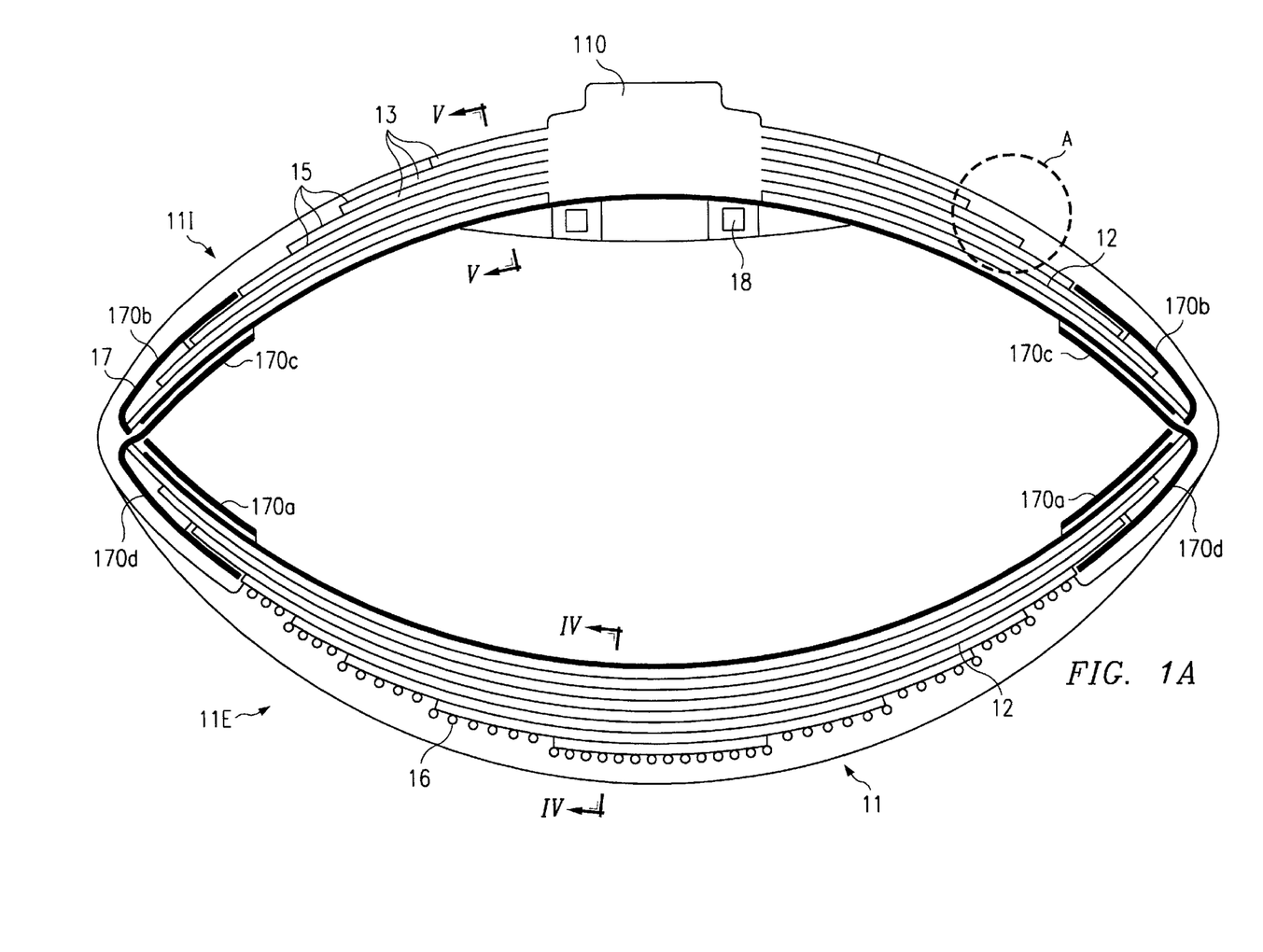
FIG. 1A is a radial section, similar to FIG. 1, of a second embodiment of a non-pneumatic tire according to the invention.

Returning to the connection between the radially outer bearing structure part 11E and the radially inner bearing structure part 11I, which was said to form a sort of hinge 17, appreciably inextensible radial wires 170, embedded in a rubber matrix, cover the junction of the outer side of the latter, in order to integrate correctly the radially inner bearing structure part and the radially outer bearing structure part. These radial wires 170 are placed in the zones of lesser bending strength and are embedded in a rubber matrix. As a variant shown in FIG. 1A, each radial wire is placed relative to the support elements of the inner cavity side on one of the bearing structure parts (see wires 170*a* and 170*c*) and of the outer side on the other one of the bearing structure parts (see wires 170*b* and 170*d*), some of the successive wires on said first radially inner bearing structure part being placed outside and the others being placed inside the inner cavity, preferably alternately.

In this first embodiment, the laminated elements 12 resemble compound springs, except that here the sheets are fixed to one another by a layer of rubber. The radially inner and outer bearing structure parts 11I and 11E present, in the whole meridian plane, a quasisymmetry on both sides of a virtual cylinder passing through the hinges 17. The radially outer and inner bearing structure parts 11E and 11I are so constructed that each takes approximately half the deflection resulting from a loading, which is favorable to endurance of the zone forming a hinge, for deflection is possible with relative motion of the axial ends of the bearing structure parts. FIG. 3 shows the shape of the non-pneumatic tire loaded.

It is to be understood that, in case of very considerable overload, due, for example, to a shock against a sidewalk curb, the radially outer bearing structure part naturally abuts the radially inner bearing structure part. This occurs well before the laminated elements might have been bent to the breaking point. This is why the non-pneumatic tire proposed in the invention contributes a very sturdy solution, offering good endurance under the effect of the most severe stresses that might be encountered in normal service on a vehicle.

The non-pneumatic tire illustrating the first embodiment described above contains laminated elements arranged roughly radially. As is known from operation of a standard radial tire, it is noted that the laminated elements accommodate a slightly non-radial orientation. That means that the reinforcing elements, which are normally radially oriented in the sidewalls (carcass cords in a conventional pneumatic radial tire, support elements in the described embodiments proposed in this specification), leave somewhat their genuine radial orientation, the maximum value of deviation being observed on entry and on exit of the footprint. Consequently, passage into the footprint, in addition to bending, the support elements are subjected to torsion and stress. This deviation with respect to the radial orientation is possible as the support elements are designed to accommodate deformations other than deflection in a radial plane.

As for attachment on means of connection to a hub, the tire can be attached to a wheel disk or any other member securing rigid functional connection with a hub. The tire and wheel assembly presents, in the manner known for pneumatic tires, a transverse rigidity sufficient to be able to guide a vehicle, notably, on turns. As far as the non-pneumatic tire is concerned, one or more circumferentially inextensible reinforcements, for example, rigid hoops 18 for the first embodiment, are placed in the zone of attachment and contribute to good locking of the tire on its rim in case of transverse stresses.

Figure 6:
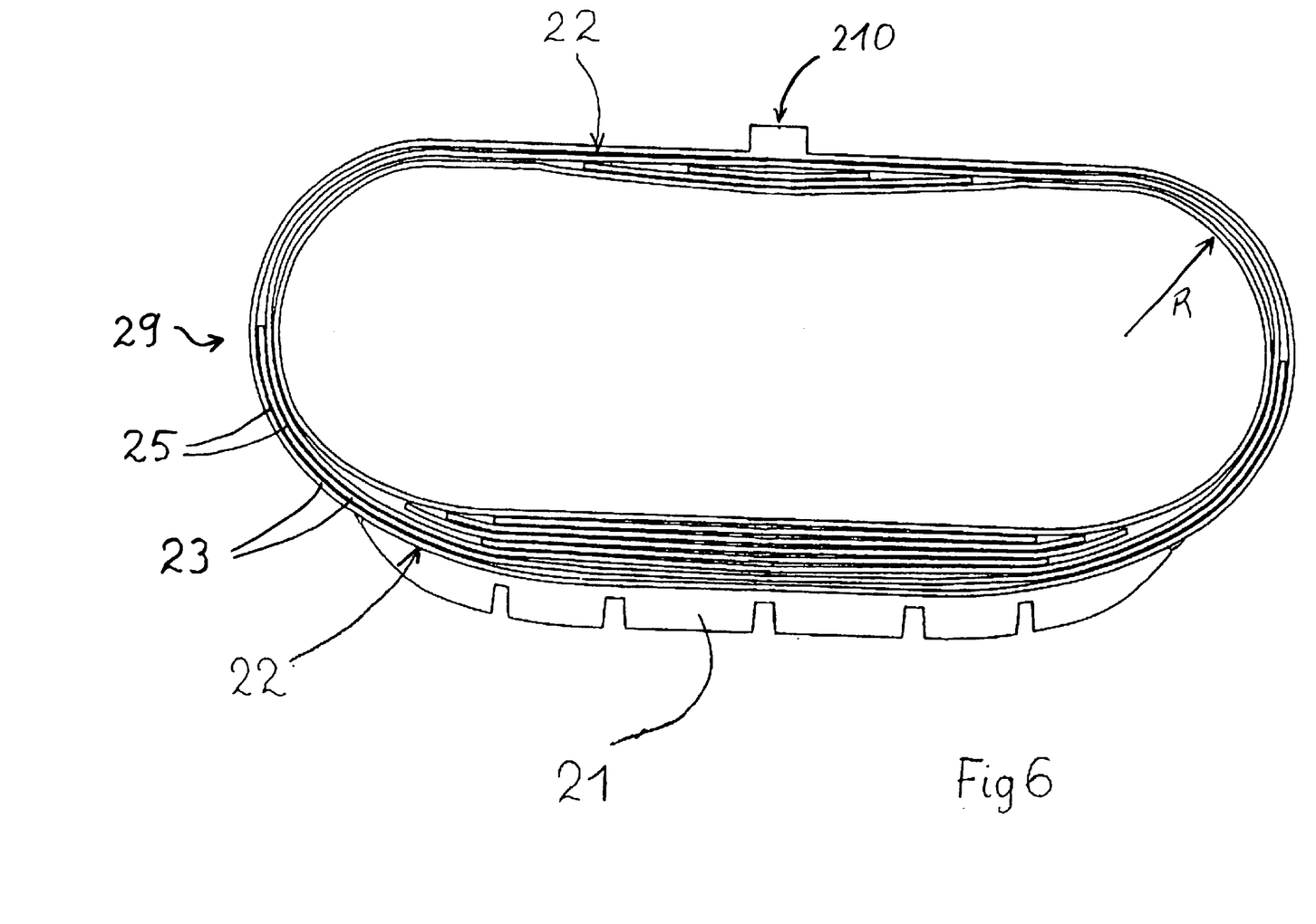
FIG. 6 shows a radial section of a second embodiment of a non-pneumatic tire according to the invention, having a tread of rather flat shape, common for tires designed to operate at zero or very narrow angles of camber.

FIG. 6 illustrates a second embodiment, in which the non-pneumatic tire profile, seen in meridian section, resembles the profile of a tire designed to work at small or zero camber angles (like passenger tires). The sidewalls are rounded and lie in almost all of the radial height of the non-pneumatic tire. The bearing structure essentially contains laminated elements 22 comprising a stack of resilient sheets 23, superposed and separated by layers of rubber 25; and embodies the support elements. An attachment zone 210 is arranged substantially in the middle of the radially inward wall of the non pneumatic tire. The support elements jump over the attachment zone and project beyond said attachment zone, and as in the first embodiment are fitted so as to be able to undergo bending stresses.

The parameters of size and adjustment of properties of the non-pneumatic according to this second embodiment are, notably, those previously mentioned, namely, the thickness of layer 25 and each sheet 23, the number of sheets, the modulus of elasticity of the elastomer materials employed for the sheets, the modulus of elasticity of the elastomer used, and the arrangement of the sheets. Likewise, for the composition of the sheets 23, references should be made to the explanations supplied for sheet 13. The non-pneumatic tire also contains circumferential reinforcements (not shown) under the tread.

The non-pneumatic tire contains a tread 21, which can be very slightly bent when it is not supporting any load. The radially outer part of the bearing structure, that is, the zone containing the tread 21 and the part of the sidewalls 29 close to the tread 21, contribute only very little to deflection (radially) under the effect of the load. The sidewalls 29 and, in particular, the radially inner part of the latter, as well as the radially inner wall of the bearing structure, are the seat of deformations responsible for most of the deflection under load. The part of the radially inner bearing structure, which at zero load is appreciably straight (see FIG. 6), parallel to the axis of rotation, takes a bowed shape, the concavity of which is directed inward (see FIG. 7), which is accompanied by a slight relative coming together of its lateral limits. This type of deformation applies to each of the lateral zones of the bearing structure under the tread, a moment tending to transfer the load to the central zone of the tread and concomitantly to relieve the shoulders of the tire, which on the whole makes it possible to ensure a relative constancy of pressures on the surface in the footprint.

Just as in the first embodiment, the tire is attached to a wheel disk or to any other member ensuring rigid functional connection with a hub. The assembly presents, in the median zone of the radially inner wall of the bearing structure, a transverse rigidity sufficient to be able to guide a vehicle, notably, on turns.

Let us further note that the properties of the non-pneumatic tire can be adjusted by working on the design of the means of connection to the hub of the non-pneumatic tire, called "rim" for sake of convenience. By more or less widening the bearing surface 291, preferably symmetrically, the radial resilience of the non-pneumatic tire can be adjusted, somewhat like the inflation pressure of a pneumatic tire, which is adjusted for a tire of the same model according to the vehicle equipped, according to the axle of the vehicle and according to whether the vehicle is used loaded or empty. Therefore, depending on the rim used, the radial resilience of the tire mounted on its rim varies.

Figure 7:
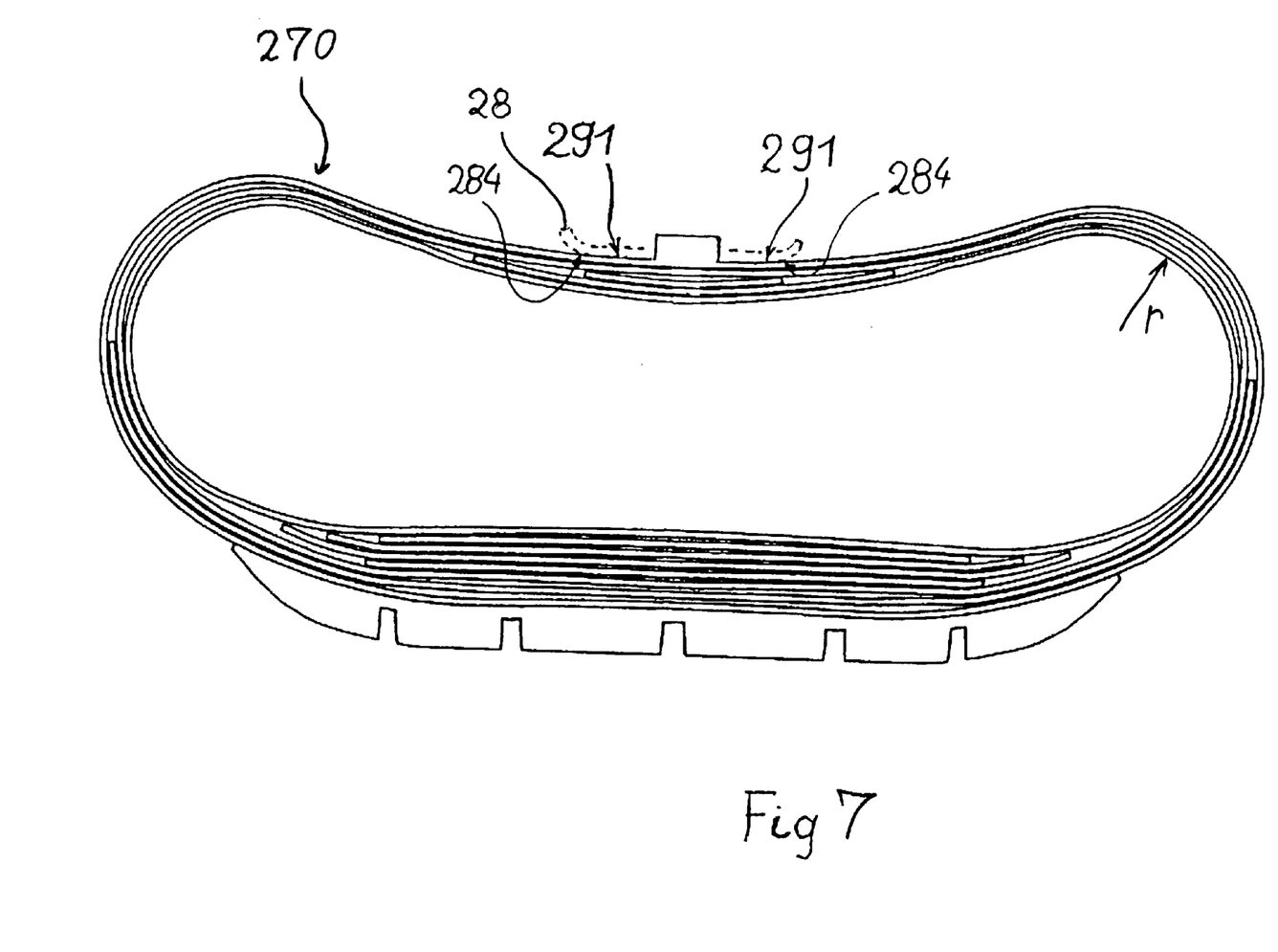
FIG. 7 shows the non-pneumatic tire of FIG. 6, deformed to an intermediate deflection level.
Figure 9:
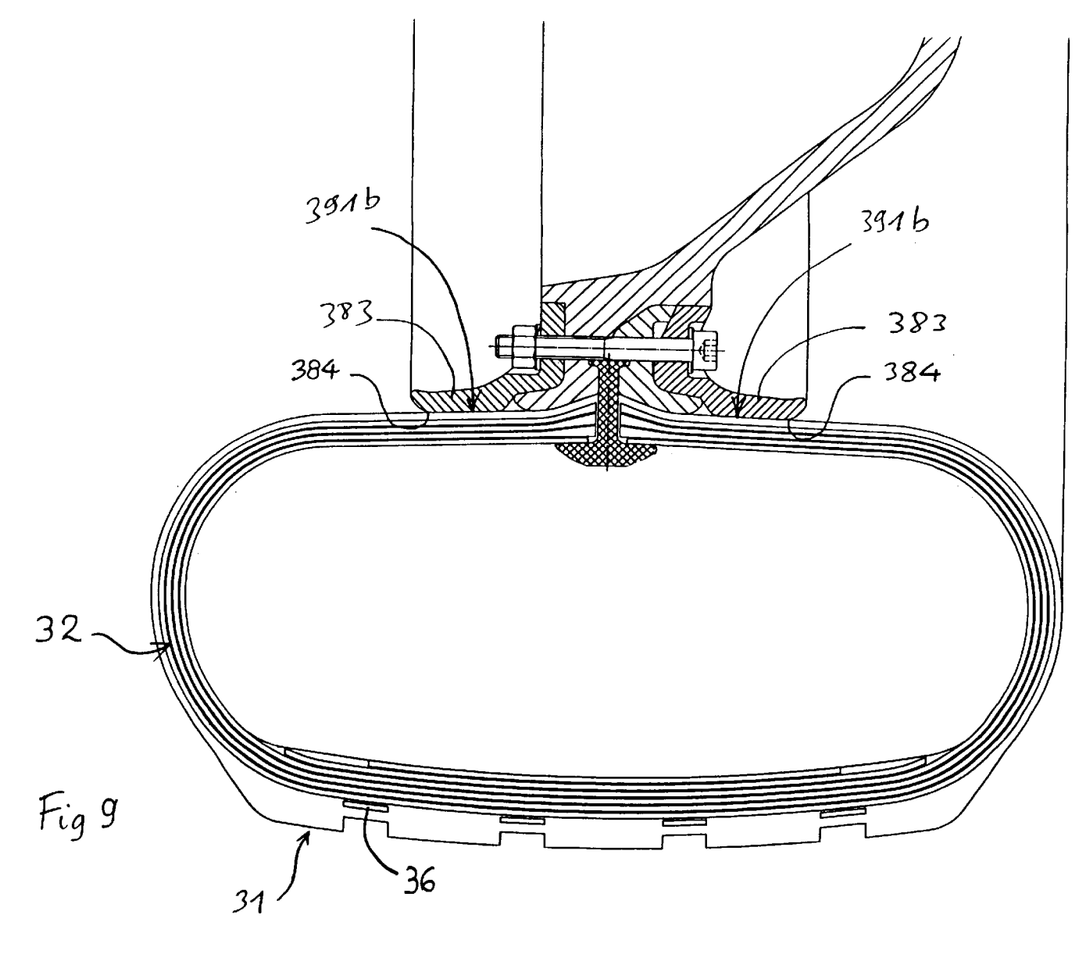
FIG. 9 shows the non-pneumatic tire of FIG. 8, mounted on a different rim.

The invention extends to a rim intended to be used with a deformable non-pneumatic tire designed as explained above, said rim containing mounting means for receiving and locking said zone of attachment of the tire and containing, on at least one side axially (and preferably on both sides), a seat extending roughly parallel to said zone of attachment of the non-pneumatic tire, in which the axial position of the axially outermost point 284 still in contact with the non-pneumatic tire is adjustable (see FIG. 7, it being known that said bearing surface is located axially between the axially outermost points 284, or 384 in FIG. 9). In this way, the bearing surface 291 of the tire on the rim can be varied. All along the bearing surface, the wall of the tire cannot be radially displaced toward the axis of rotation, which alters operation of the tire wheel.

Figure 8:
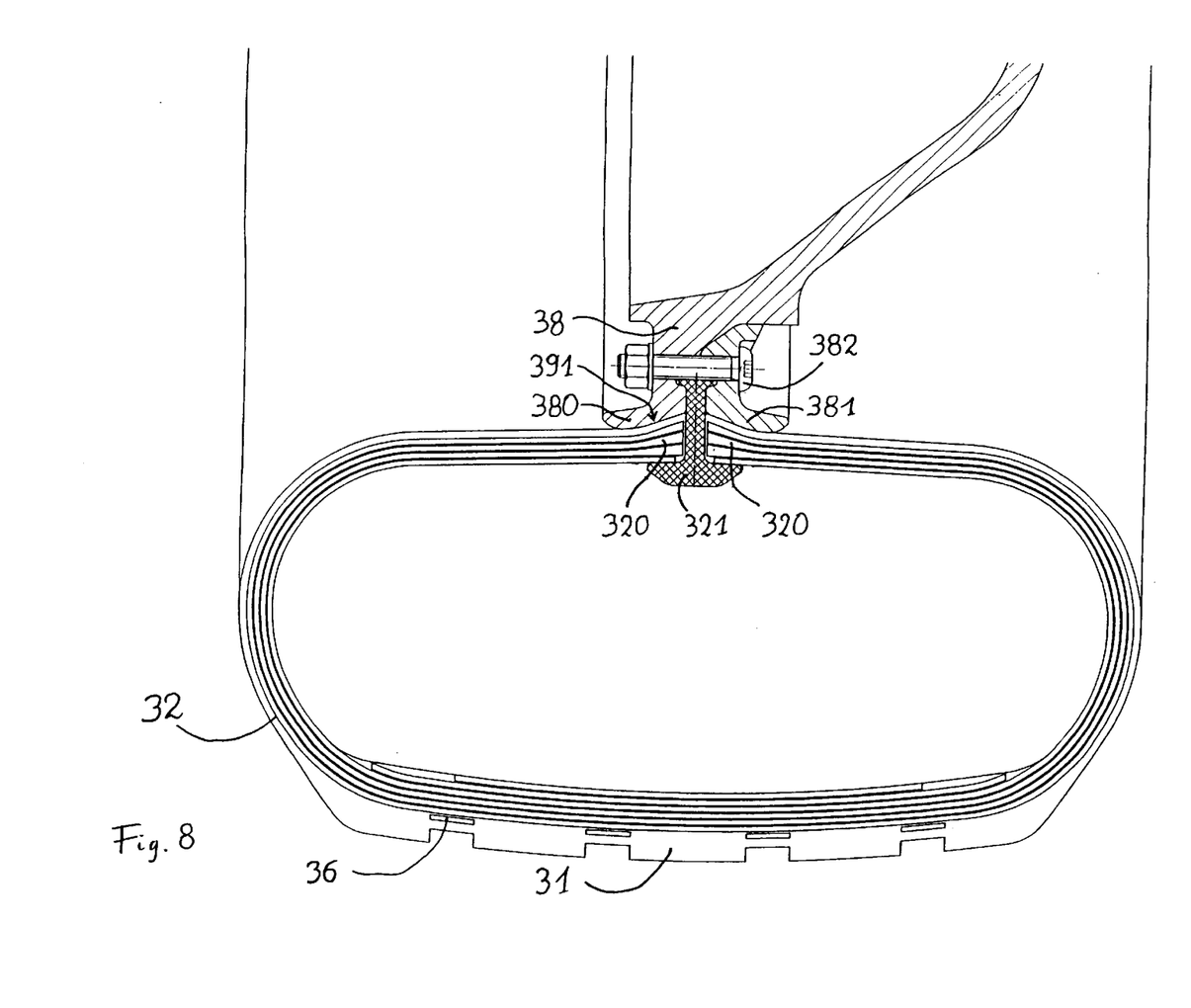
FIG. 8 shows a radial section of a third embodiment of a non-pneumatic tire according to the invention, also having a tread of rather flat shape, common for tires designed to operate at zero or very narrow angles of camber.

FIGS. 8 and 9 illustrate a third embodiment very similar to the second. A tread 31 and support elements 32 are provided. The interconnecting structure contains circumferential reinforcements 36 in sheet form. The zone of attachment is circumferentially slotted (not shown in the simplified views of FIGS. 10 and 11), so that the non-pneumatic tire presents two connecting ribs 320, capable of being axially displaced relative to each other. Said connecting ribs 320 are each intended to come in contact with the said means of connection to a hub, notably, through a contact bearing 391 on the radially inner side of each of the connecting ribs 320. Said ribs are the attachment zone referred to hereinabove.

It can be seen in FIG. 8 that the latter resembles a narrow rim designed to grip said connecting ribs 320 by means of a profiled part 321 of suitable shape. A wheel disk 38 extended by a first flange 380 can be seen. A second flange 381 is mounted on the disk 38 by means of screws and nuts 382, with insertion of the profiled part 321 and connecting ribs 320 of the non-pneumatic tire. The profiled part 321 is a rotating piece whose meridian section is clearly visible in FIGS. 8 and 9, and which can be slotted and therefore interrupted circumferentially, so as to facilitate its insertion between the ribs 320 of the non-pneumatic tire. Next, the non-pneumatic tire, with the profiled part inserted between the ribs 320, is correctly positioned relative to the first flange 380, and then the second flange 381 is fastened on the first, with interposition of the profiled part. Part 321 makes it possible, with the first and second flanges 380 and 381, to grip the connecting ribs 320, so that the non-pneumatic tire is fitted on the means of connection to the hub, which is the preferred mounting of the non-pneumatic tire.

Thus, the invention also extends to a rim containing mounting means for receiving and locking a resilient non-pneumatic tire having an axis of rotation and essentially containing a tread carried by a resilient bearing structure radially situated inside said tread and defining, at least partially, an inner cavity of revolution, said bearing structure embracing a zone of attachment radially on the side of the axis of rotation, for the locking of said bearing structure on means of connection to a hub, said means of connection to a hub forming a rigid assembly, said zone of attachment being placed axially between the lateral limits of said bearing structure, and said zone of attachment being circumferentially slotted, so that the tire presents two connecting ribs 320, capable of being axially displaced in relation to each other, said rim including:

- two flanges 380, 381, each serving as seat for one of the two ribs 320,
- a profiled shape 321 designed to cooperate with said flanges 380, 381 in order to grip said ribs 320 and to lock them on the rim.

The form of manufacture of the non-pneumatic tire can be different from the form of use required by the means of connection taking the place of a rim. For example, the connecting ribs 320 can be forced to come together axially on mounting. The widened shape of the connecting ribs 320, forming a sort of dovetail, helps avoid any accidental demounting of the tire under the effect of the prestressing installed in same. The resilience can thus be adjusted by a preload in the laminated elements 32 according to the relative axial separation between the connecting ribs 320 of the non-pneumatic tire.

Furthermore, just as already explained above, depending on the size of the contact bearing 391, it is possible to act on the deflection by the non-pneumatic tire. Supplementary rings 383 can also be added to widen the bearing surface of the non-pneumatic tire for the purpose mentioned above (see bearing 391b in FIG. 9).

Figure 10:
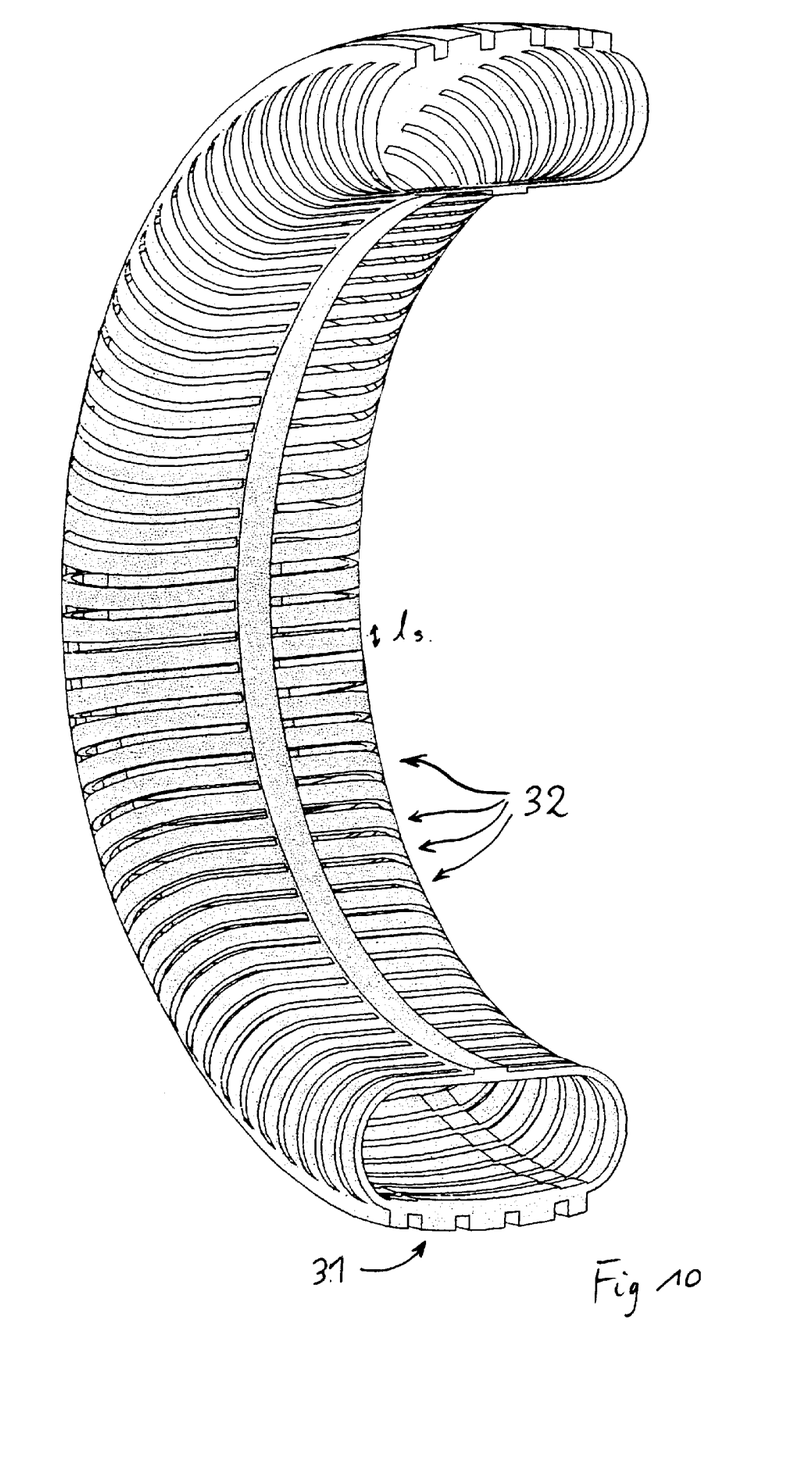
FIG. 10 is a partial sectional perspective, diagrammatically showing essentially the structure of the non-pneumatic tire according to the third embodiment without load, in a state free of any stress.
Figure 11:
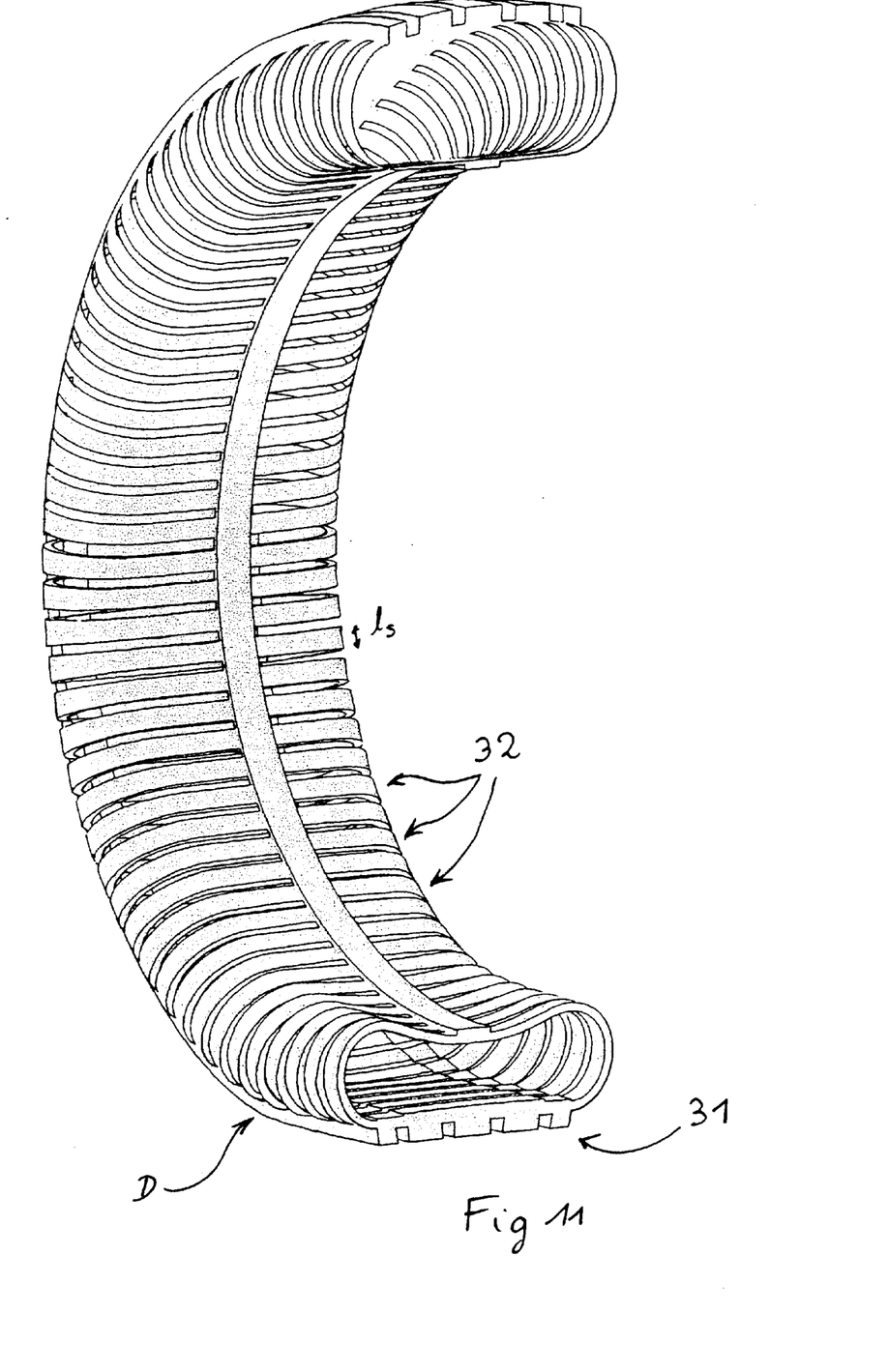
FIG. 11 is a partial sectional perspective, showing essentially the deformation under load of the structure of the non-pneumatic tire according to the second and the third embodiments.

Finally, FIGS. 10 and 11 represent the general shape of the resilient bearing structure. Comparison of those figures shows the deflection obtained with a non-pneumatic tire according to the invention. A certain degree of deviation with respect to the radial orientation exists in all the embodiments. This is notably evident at the bottom of FIG. 11, by carefully observing the bent zone D, where it can be seen that the deflection of the support elements come with a certain degree of warping, the more the support element is offset of the section plane of FIG. 11 while bending in the footprint, the greater the deviation is.

In the examples illustrating this specification, the support elements take the form of laminated elements. The bundle of base pieces is therefore formed by a stack of sheets, with insertions of rubber, whatever the construction of the sheets themselves. In light of the following description, the function of these support elements will more readily appear, and the person of skill in the art will, of course, be able to substitute those laminated elements with other forms of construction, that is, substitute the sheets with other forms for the base pieces, provided that the support elements offer the radial flexibility sought and make the required contribution to take-up of the load and are also capable of offering suitable characteristics in response to the nonradial stresses seated in such non-pneumatic tires (transmission of so-called "X" and "Y" stresses) and of working in harmony with the adjacent support elements. In other words, the bearing structure, on being deformed, makes possible a certain flattening of the zone under the tread concerned on contact with the surface, so that the track of the loaded tire on the surface takes a certain form, as in the well known operation of inflated tires.

Each support element is present at least in the part of the bearing structure lying between the lateral ends of said bearing structure and the tread and not necessarily under the tread, although in the examples described said support elements are continuous under the tread. One could, however, as a variant and at least under a substantial part of the tread, replace the stack of sheets, that is, the bundle of base pieces, with a rather rigid ring of the type proposed as reinforcement under the tread in U.S. Pat. No. 4,111,249. The stack of sheets can also be replaced with a relatively rigid stud; a large number of studs are arranged circumferentially, the set of studs being articulated with one another and thus forming a sort of circumferential track (see, for example, the reinforcing structure under the tread described in patent application EP 0,836,956). More generally speaking, any structure could thus be placed under the tread, provided that it is capable of transferring a shear to the lateral parts of the non-pneumatic tire.

In all the variants proposed, the part of the radially inner bearing structure closest to the axis of rotation makes an important contribution to the deflection under load and, therefore, to the comfort provided by the tire. Hence, it is advisable for the zone of attachment to be located preferably on a fraction corresponding to not more than 50% of the distance axially separating the lateral limits of the non-pneumatic tire. The radially inner part of the resilient bearing structure thus rather markedly projects beyond the zone of attachment. A favorable structural arrangement is for the support elements to be oriented, just beyond the zone of attachment, in a direction roughly parallel to the axis of rotation. This is what appears in the examples described below. Finally, the non-pneumatic tires described being symmetrical, the zone of attachment is roughly centered between the axial limits of said non-pneumatic tire, without this being limitative. A dissymmetrical architecture could, of course, be adopted, notably, in the location of the zone of attachment.

As for the degree of contribution to the deflection under load of the part of the radially outer bearing structure, it can vary with the embodiments.

In the first example proposed, the bearing structure contains a first radially inner bearing structure part and a second radially outer bearing structure part, said first and second bearing structure parts being integrated with each other by a zone of lesser bending strength, each of said first and second bearing structure parts containing said support elements, and each support element of the first radially inner bearing structure going at least from a lateral end to said zone of attachment, so that the zones of lesser bending strength between the first and second bearing structure parts are, under the effect of the working stresses, radially mobile in relation to the zone of attachment. Each support element of the second radially outer bearing structure preferably goes from one lateral end to the other lateral end of said second bearing structure part.

The radially inner bearing structure part forms two zones which overhang the rigid central connection. According to the invention, these two zones fully share in the flexibility of the non-pneumatic tire. This is what it was intended to express above on stating that the zones of lesser bending strength are, under the effect of the working stresses, radially mobile in relation to the zone of attachment. This has one clear consequence, valid moreover for all the embodiments: to permit efficient operation of the non-pneumatic tire according to the invention, no obstacle should prevent elastic deformation radially inward from the radially inner bearing structure part, that is, the part leading to said rigid central connection. The latter, on bending, comes somewhat close to the axis of rotation. The shape of the non-pneumatic tire on maximum bending therefore dictates a limiting casing inside of which one cannot encounter any of the mechanical parts of the vehicle: wheel disk and/or rim, braking parts, suspension parts, etc.

In the first of the examples illustrated, the degree of contribution to deflection under load of the radially outer bearing structure part is roughly equivalent to the degree of contribution to deflection under load of the radially inner bearing structure part. Of course, said zone of lesser bending strength can be less localized and can involve a greater portion of the wall of the bearing structure.

In a second embodiment, the support elements are continuous in the sidewall of the tire. The contribution to deflection is due mainly to the bearing structure part situated radially inward. It can be seen, in FIGS. 6 and 7, that the deflection due to loading leads to a decrease of the radius of curvature of the support elements: "R" in FIG. 6, showing the unloaded non pneumatic tire, is greater than "r" in FIG. 7, showing the loaded non pneumatic tire.

Turning to the mounting of the non-pneumatic tire proposed by the invention, in the case of a standard tire, it is known that the rim has roughly the width of the tire. Here, on the other hand, the non-pneumatic tire projects widely on both sides of the central mechanical part taking the place of a rim, which has been more generally described in the introduction to the invention by the more functional expression "means of connection to a hub." This connection can take highly varied forms. It can involve a disk similar to a wheel disk, ending in a revolving part, the meridian profile of which is an open groove toward the wider radii, made, for example, in two parts in order to be able to tighten a rib of the non-pneumatic tire having a complementary shape. It can also involve a wheel of the type described in U.S. Pat. No. 5,071,196, that is, without any disk. In short, to state the essentials, the connection to a hub are rigid, as is the wheel with its rim in the current state of the art.

As for the material constituting the base pieces, it is advantageously a composite material, that is, a combination of different materials. The support elements illustrated here are laminated elements. The geometry of the support elements makes it possible to offer them the resilience desired without attaining the breaking points or elastic limit to the deformations encountered. Each of the sheets is very narrow in order to offer a substantial deflection. Each one is able to accommodate small radius on bending. None is capable of alone bearing the nominal load sought. By multiplying the sheets, their contribution to support the load are added. The sheets are integrated with one another by the rubber adhering to said sheets. Due to a stacking of some very thin sheets, a sufficient bearing is obtained, while being able to attain very high deflection.

The architecture of the tire proposed makes it possible to manufacture tires designed to operate without inflation pressure (non-pneumatic tire). Note, and this is important, nothing prevents imparting a certain air pressure to the proposed tire. It is sufficient, of course, to arrange for the tire to be airtight. An adequate skin is added to the bearing structure, which is useful in any case to prevent fouling of the inner cavity. The characteristics, resilience, notably, can then be adjusted by working with pressurization of the inner cavity. In doing a comparison with a inflated pneumatic tire, the pressurization referred to here is related to the variations around the rated pressure for which the pneumatic tire is designed. That is to say that, if according to the final destination of a pneumatic tire on different specific cars, the tire is used at pressure ranging from P to P+$\Delta$P, the non pneumatic tire in accordance with this invention can be actually used in the range of 0 (no pressure at all) to 0+$\Delta$P. But this is only one means of adjustment among others that are more structural, which have been explained, the non-pneumatic tire of this invention having been actually assigned to work at zero pressure in normal operation.

One advantage of the present invention is to propose an architecture which makes it possible, in particular, both to bear the desired load and to absorb without damage very isolated obstacles like a stone on the road.

Another advantage of the invention is to ensure, other than by tightening of a bead on a rim, the connection between the tire and the rim or the part or parts taking the place of a rim in order to give the reference that is the axis of rotation. This results in a saving of materials and, therefore, a weight advantage of this tire portion.

It has been seen that the resilient non-pneumatic tire includes a bearing structure, a tread radially outside the bearing structure and means of attachment to a rigid rim or to an equivalent mechanical part. It has also been seen that the bearing structure has a plurality of support elements juxtaposed and distributed all around the circumference, each support element being placed in a mainly transverse and generally radial orientation, so that each support element successively enters into play to transfer a fraction of the load of the non-pneumatic tire from the tread to the hub, when the tire is rolling and is loaded, transfer of the load subjecting each element essentially to bending stress. Moreover, it has been observed, with the embodiments according to FIGS. 6 to 11, that upon increase of the transversal stresses as occurring for example in turns, a slight decrease of the radial deflection occurs, providing an anti-roll effect.

In short, the support elements advantageously consist of laminated elements including a stack of resilient sheets, the resilient sheets being radially superposed and separated by a layer of elastomer adhering to each of the sheets, bending of the laminated elements being accompanied by a relative tangential displacement between sheets and by a shear stress of the elastomer, each laminated element being radially resilient under the effect of the working stresses, the bending of a laminated element transferring a moment to said means of attachment. In addition, it has been seen that the bearing structure includes means of interconnection between the support elements (the laminated elements), arranged so that a portion of the radial stress of the support elements is transferred to the circumferentially adjacent laminated elements, while allowing differences in displacement between adjacent laminated elements. These means of interconnection can involve the support elements over their whole length or only over part of same, particularly under the tread. The bearing structure is so arranged that, when the radial deflection taken by the non-pneumatic tire brings the radially outer part of the bearing structure against the zone of attachment to the rim (immobile), the resulting stresses due to bending in the support elements are less than the breaking point (and are less than the elastic limit if a material having an elastic limit less than the breaking point is included in the composition of the base pieces).

We claim:

1. A non-pneumatic tire having a bearing structure, extending circumferentially about an axis of rotation and including a radially inner wall and a radially outer wall defining therebetween, at least partially, an inner cavity of revolution, and a tread carried by the radially outer wall of the bearing structure, said bearing structure comprising:

a zone of attachment on the radially inner wall for connecting the bearing structure to means of connection to a hub, said zone of attachment being located axially between the axial outer limits of the radially inner wall and having axial sides separated by a distance not greater than 50% of the axial distance between the axially outer limits of the bearing structure;

a plurality of support elements aligned substantially crosswise to the circumferential direction and extending in the crosswise direction, in the radially inner wall, from at least the axial sides of the zone of attachment towards the axially outer ends of the radially inner wall and, in the radially outer wall, from one axial end thereof to the other, said support elements being circumferentially juxtaposed and distributed all around the circumference of the bearing structure, each support element including a bundle of superimposed resilient base pieces, separated by a layer of elastomer adhering to each of the base pieces, so as to form a beam capable of undergoing bending stress and flexing radially at least along a part of its crosswise length when the tire is loaded, said part of the crosswise length of each support element in the radially inner wall being located axially outward of the zone of attachment; and an interconnecting structure interconnecting portions of the support elements in at least the radially outer wall and arranged so that a portion of a radial stress of a support element is transferred to the circumferentially adjacent support elements, while allowing differences in displacement between adjacent support elements.

2. A non-pneumatic tire according to claim 1, in which said support elements are continuous under the tread.

3. A non-pneumatic tire according to claim 1, in which the base pieces are made of composite material.

4. A non-pneumatic tire according to claim 1, in which the support elements are axially adjacent the zone of attachment, oriented in a direction roughly parallel to the axis of rotation.

5. A non-pneumatic tire according to claim 1, in which the zone of attachment is roughly centered between the axial limits of said tire.

6. A non-pneumatic tire according to claim 1, in which the zone of attachment is in one piece.

7. A non-pneumatic tire according to claim 1, in which the circumferential width of each base piece is constant.

8. A non-pneumatic tire according to claim 1, in which the base pieces are formed from a thermosetting or thermoplastic resin matrix, reinforced by fibers mainly placed longitudinally in each sheet.

9. A non-pneumatic tire according to claim 1, in which the circumferential dimension of each support element is such that the number of support elements in the whole circumference is at least 80.

10. A non-pneumatic tire according to claim 1, in which the circumferential dimension of each support element is such that the number of support elements in the whole circumference is at least 200.

11. A non-pneumatic tire according to claim 1, in which the interconnecting structure includes circumferential reinforcements at least under the tread.

12. A non-pneumatic tire according to claim 1, in which the interconnecting structure contains a rubber matrix circumferentially separating the adjacent support elements.

13. A non-pneumatic tire according to claim 1, in which the support elements are arranged roughly radially.

14. A non-pneumatic tire according to claim 1, in which the zone of attachment includes at least one circumferentially inextensible reinforcement.

15. A non-pneumatic tire having a bearing structure, extending circumferentially about an axis of rotation and including a radially inner wall and a radially outer wall defining therebetween, at least partially, an inner cavity of revolution, and a tread carried by the radially outer wall of the bearing structure, said bearing structure comprising:

a zone of attachment on the radially inner wall for connecting the bearing structure to means of connection to a hub, said zone of attachment being located axially between the axial outer limits of the radially inner wall and having an axial sides separated by a distance not greater than 50% of the axial distance between the axially outer limits of the bearing structure;

a plurality of support elements aligned substantially crosswise to the circumferential direction and extending in the crosswise direction, in the radially inner wall, from at least the axial sides of the zone of attachment towards the axially outer ends of the radially inner wall and, in the radially outer wall, from one axial end thereof to the other, said support elements being circumferentially juxtaposed and distributed all around the circumference of the bearing structure, each support element including a bundle of superimposed resilient base pieces, separated by a layer of elastomer adhering to each of the base pieces, so as to form a beam capable of undergoing bending stress and flexing radially at least along a part of its crosswise length when the tire is loaded;

the radially inner and outer walls of the bearing structure being integrated with each other by a zone of lesser bending strength, each support element of the radially inner wall extending at least from a lateral end thereof to said zone of attachment, so that the zones of lesser bending strength between the radially inner and outer walls of the bearing structure parts are, under the effect of the working stresses, radially mobile in relation to the zone of attachment; and an interconnecting structure interconnecting portions of the support elements in at least the radially outer wall and arranged so that a portion of a radial stress of a support element is transferred to the circumferentially adjacent support elements, while allowing differences in displacement between adjacent support elements.

16. A non-pneumatic tire according to claim 15, in which each support element of the radially inner wall extends from one lateral end to the other lateral end.

17. A non-pneumatic tire according to claim 15, in which a meridian section of the radially inner wall has a general bow shape, the concavity of which is oriented radially outward.

18. A non-pneumatic tire according to claim 15, in which the meridian section of the radially outer wall has a general bow shape, the concavity of which is oriented radially inward.

19. A non-pneumatic tire according to claim 15, in which the ends of each of the radially inner and outer walls of the bearing structure are situated roughly at the lateral limits of the bearing structure.

20. A non-pneumatic tire according to claim 15, in which the zones of lesser bending strength contain inextensible radial wires embedded in a rubber matrix.

21. A non-pneumatic tire according to claim 20, in which each radial wire is placed relative to the support elements on the radially inner cavity side on one of the radially inner and outer walls and on the outer side on the other of the radially inner and outer walls, some of the successive wires on said radially inner wall being placed outside and the others being placed inside the inner cavity.

22. A non-pneumatic tire according to claim 15, in which the length of each of the base pieces in the axial direction decreases on being displaced in thickness of a support element from the cavity outward.

* * * * *